United States Patent [19]

Fuchioka et al.

[11] Patent Number: 5,473,407
[45] Date of Patent: Dec. 5, 1995

[54] SHEET FIXING DEVICE FOR A DRUM OF A SCANNER

[75] Inventors: Hiroyuki Fuchioka; Shinji Ito, both of Kyoto, Japan

[73] Assignee: Dainippon Screen Mfg. Co., Ltd., Japan

[21] Appl. No.: 300,459

[22] Filed: Sep. 2, 1994

[30] Foreign Application Priority Data

Sep. 6, 1993 [JP] Japan .................. 5-053381 U

[51] Int. Cl.⁶ .......................... G03B 27/58; G03B 27/62; B41F 1/28; B41F 21/00
[52] U.S. Cl. ........................................ 355/47; 101/415.1
[58] Field of Search .............................. 359/197; 355/47, 355/48, 84, 72; 101/378, 415.1; 226/93; 271/276

[56] References Cited

U.S. PATENT DOCUMENTS

| | | | |
|---|---|---|---|
| 2,878,095 | 3/1989 | Hackenberg et al. | 346/138 |
| 3,610,121 | 10/1971 | Hanson et al. | 355/47 |
| 3,710,707 | 1/1973 | Hanson et al. | 355/47 |
| 3,896,728 | 7/1975 | Nakagawa | 101/415.1 |
| 4,843,433 | 6/1989 | Minami et al. | 355/49 |
| 5,325,778 | 7/1994 | Hartung et al. | 101/415.1 |
| 5,361,698 | 11/1994 | Simeth | 101/415.1 |
| 5,383,001 | 1/1995 | Bosy | 355/73 |
| 5,408,297 | 4/1995 | Matsuo et al. | 355/104 |

FOREIGN PATENT DOCUMENTS

| | | |
|---|---|---|
| 59-18778 | 5/1984 | Japan . |
| 704152 | 2/1954 | United Kingdom . |
| 745218 | 2/1956 | United Kingdom . |

*Primary Examiner*—Richard A. Wintercorn
*Attorney, Agent, or Firm*—Ostrolenk, Faber, Gerb & Soffen

[57] ABSTRACT

An original or a photosensitive film is held by a sheet holder and the sheet holder is fixed to the drum of an image reading scanner or an image recording scanner by a row of hooks planted on the drum. A row of holes corresponding to the row of hooks are formed at each of the opposing ends of the sheet holder. A hook is composed of: a stem, a lever rotatably attached with a pin to the stem, and a plate urged upward by a spring against the bottom of the lever. A plane is formed at a side of the bottom of the lever. First the levers of the hooks are raised upright and the holes of an end of the sheet holder are engaged with the hooks. After surrounding the drum with the sheet holder, the holes at the other end of the sheet holder are engaged with the hooks and the levers are turned to a lying position, where the levers are stable because the plate is urged upward against the side plane of the lever.

8 Claims, 6 Drawing Sheets

SHEET FIXING DEVICE FOR A DRUM OF A SCANNER

The present invention relates to a device for fixing a sheet on a drum of a scanner.

BACKGROUND OF THE INVENTION

In a drum type image reading scanner, an original is fixed on a surface of the drum of the image reading scanner and the image of the original is read by moving a reading head along the axis of the drum while the drum is rotated. In a drum type image recording scanner, a photosensitive film is fixed on a surface of the drum and an image is recorded on the photosensitive film by moving a recording head along the axis of the drum while the drum is rotated. That is, those drum type image reading scanner and drum type image recording scanner use similar drum scanning mechanisms.

For reading or recording an accurate image, it is important in these drum scanning mechanisms to securely fix the original sheet or the recording sheet on the drum and to prevent it from moving while the drum rotates.

Various sheet fixing mechanisms have been devised so far for that purpose. One is shown in the Publication of the Japanese Examined Utility Model Application No. S59-18778 in which, as shown in FIG. 6 of the Publication, an original 23 is inserted between a pair of transparent sheets 25 and 26 of a sheet holder 24, and the sheet holder 24 is fixed on the drum surface as shown in FIG. 7 of the Publication. For fixing the sheet holder 24 on the drum surface, a row of holes 29 and 30 are made at either end of the sheet holder 24, and a row of fixed pins 15 and a row of movable nails 18 corresponding to the holes 30 and 29 of the sheet holder 24 are formed on neighboring generatrix lines of the drum surface. By operating a lever 22 provided at an end of the drum, all the movable nails 18 sink down from the drum surface, and by releasing the lever 22, the movable nails 18 rise up on the drum surface. An original is fixed on the drum surface as follows. First the original 23 is inserted in the sheet holder 24. The holes 30 at one end of the sheet holder 24 are engaged with the fixed pins 15, and the sheet holder 24 is turned around the drum. While operating the lever 22, the other end of the sheet holder 24 is located over the sinking nails 18, and the lever 22 is released for raising the nails 18 to engage with the holes 29 of the other end.

In the above sheet fixing mechanism, one end and the other end of a sheet holder 24 engage with a row of fixed pins 15 and a row of movable nails 18, respectively. That is, two rows of engaging members must exist on the drum surface, which decreases the surface area of the drum that can hold an original (or a photosensitive film) and deteriorates the utility of the drum.

SUMMARY OF THE INVENTION

The present invention is thus proposed as the solution to the above problem. The sheet fixing device for fixing a sheet on a drum of a drum type scanner according to the present invention includes:

a) a plurality of stems standing on the surface of the drum;

b) a lever rotatably attached to each of the plurality of stems, the lever being rotatable between an upright position and a lying position; and c) a stabilizer provided in each of the plurality of stems for stabilizing the lever at the lying position.

The sheet fixing device may further include a sheet holder for holding the sheet and having a row of holes at each of opposing ends of the sheet holder.

The sheet fixing device is used as follows. First, the levers on the stems are set at the upright position, and holes formed at an end of the sheet or holes provided at an end of the sheet holder are engaged with the stems. The sheet or the sheet holder is turned around the drum, and the holes at the other end of the sheet or the sheet holder are engaged with the stems with the standing levers. Then the levers on the stems are rotated to the lying position where the levers are stable owing to the stabilizer, whereby the sheet or the sheet holder is securely fixed on the drum.

Since the sheet fixing device of the present invention uses only a row of engaging members on the drum surface, broader surface area of the drum can be used compared to the prior art sheet fixing device.

DETAILED DESCRIPTION OF PREFERRED EMBODIMENTS

Figure 1:
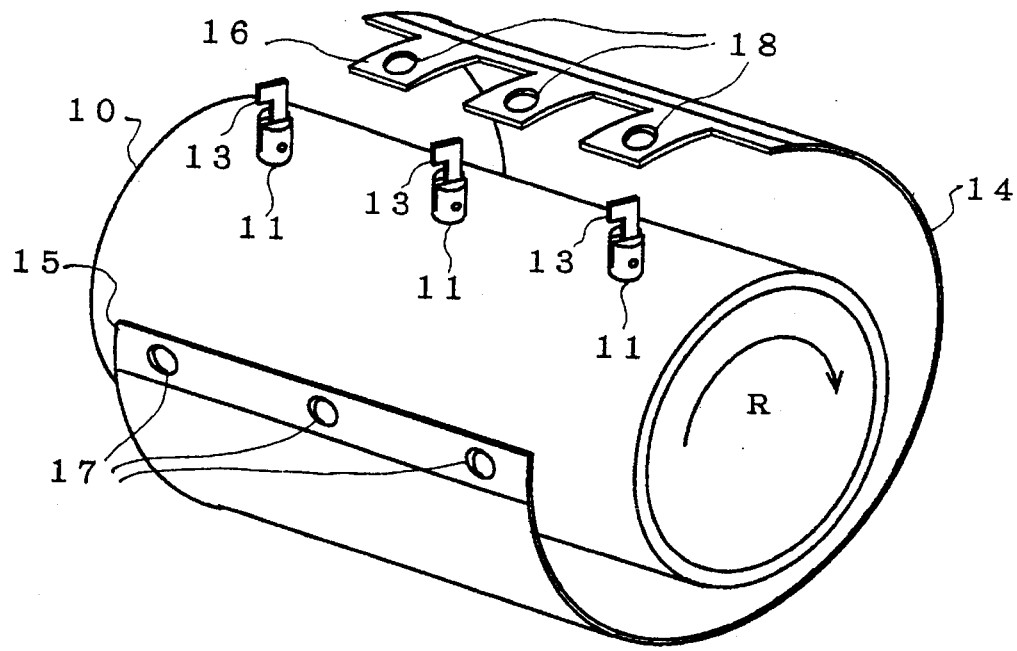
FIG. 1 is a perspective view of an original fixing device of the first embodiment of the present invention.
Figure 2:
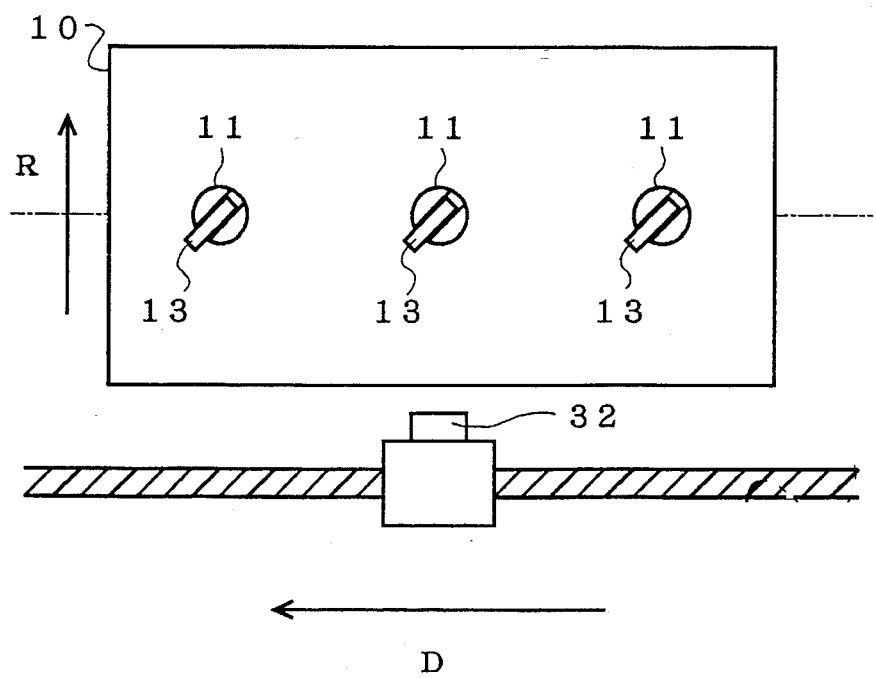
FIG. 2 is a plan view of a drum and a recording head.
Figure 3:
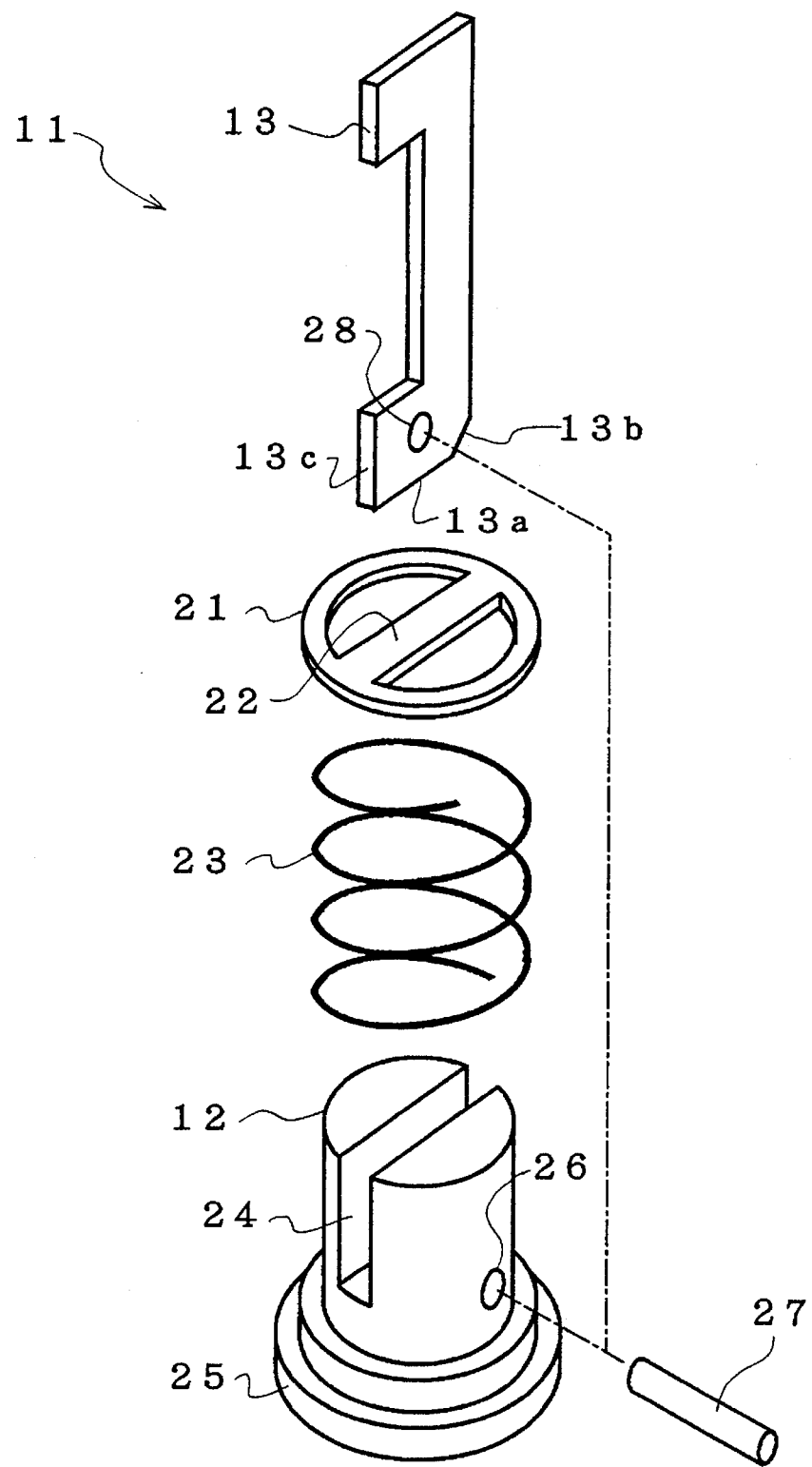
FIG. 3 is a broken view of a hook.

An original fixing device of an image reading scanner as the first embodiment of the present invention is described using FIG. 1 through FIG. 6D. In the image reading scanner, a drum 10 and a reading head 32 are placed as shown in FIG. 2. By rotating the drum 10 in the direction R and moving the reading head 32 along the axis of rotation of the drum 10, an original fixed on the surface of the drum 10 is read. As shown in FIG. 1, the original fixing device of the present embodiment is composed of three hooks 11 planted in a row along a generatrix line of the drum 10 and a sheet holder 14. As shown in FIG. 3, each of the hooks 11 is composed of: a lever 13, a ring 21 with a central bridge 22, a spring 23, a stem 12, and a pin 27. The lever 13 has a long recess at a side, thus forming a top claw and a bottom base. A stem base 25 is integrally formed at the bottom of the stem 12, and a slit 24 is formed in the upper part of the stem 12. The slit 24 has the width capable of admitting the lever 13. A through hole 26 is formed in the stem 12 in the direction perpendicular to the slit 24, and a through hole 28 is formed at the lower end of the lever 13 for admitting the pin 27 penetrating through the hole 26 of the stem 12.

The hook 11 is constructed as follows. First the spring 23 is placed on the stem base 25 of the stem 12, and the ring 21 is placed on the spring 23 with the bridge 22 aligned with the slit 24 of the stem 12. The lever 13 also aligned with the slit 24 is moved downward pressing the ring 21. When the hole 28 is aligned with the hole 26 of the stem 12, the pin 27 is inserted through the holes 26 and 28 to engage the lever 13.

Figure 5:
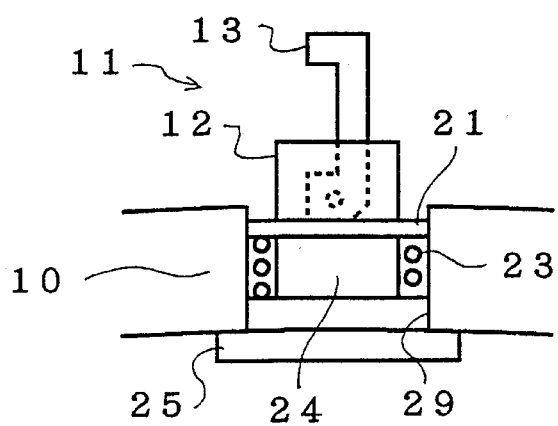
FIG. 5 is a cross sectional view of the hook attached to the drum.

As shown in FIG. 5, the hook 11 thus constructed is inserted in a hole 29 formed on the drum 10 from the inside of the drum 10. The hook 11 stops when the stem base 25 abuts the inside surface of the drum 10 and the stem 12 rises above the surface of the drum 10.

The sheet holder 14 is composed of two holding sheets and two end binders 15 and 16. Two holding sheets are made of transparent polyester film. The end binders 15 and 16 are made of rubber. As shown in FIG. 1, a row of holes 17 and 18 are formed in the end binders 15 and 16 corresponding to the hooks 11 on the drum 10, and the distance between the rows of holes 17 and 18 is made a little shorter than the peripheral length of the drum 10.

Figure 6A:
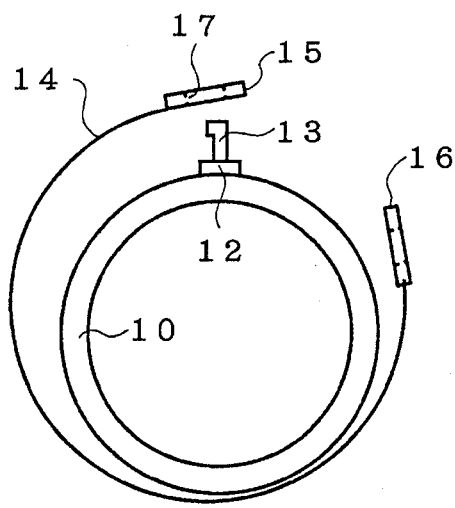
FIGS. 6A through 6D are cross sectional views illustrating how the holder is attached to the drum.
Figure 6B:
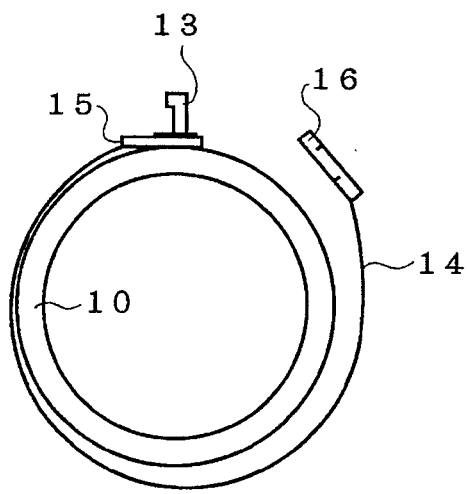
Figure 6C:
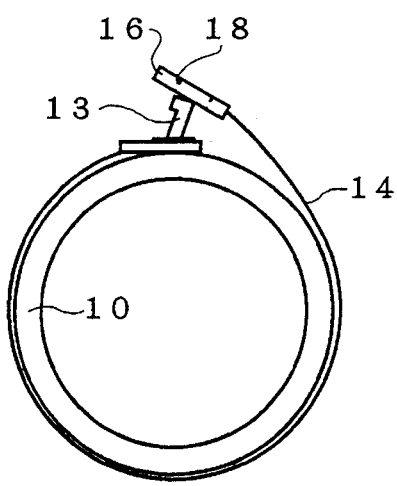
Figure 6D:
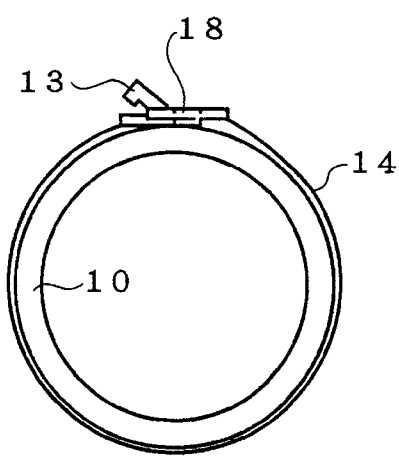

The original fixing device of the present embodiment is used as follows. First an original is inserted between the two holding sheets of the sheet holder 14, where the reading face of the original is placed to the side of the transparent holding sheet. As shown in FIG. 6A, the sheet holder 14 is turned around the drum 11 with the reading surface of the original facing outside. The holes 17 of one end binder 15 are engaged with the stems 12 of the hooks 11 as shown in FIG. 6B. Then the levers 13 of the hooks 11 are leaned backward (that is, opposite to the top claw of the lever 13). As shown in FIG. 6C, the lever 13 rests at the leaned position owing to the corner cut 13b (FIG. 4) at the bottom of the lever 13. The holes 18 of the other end binder 16 are then engaged with the hooks 11. Finally, the levers 13 are turned forward (that is, to the direction of the top claw of the lever 13) until they lie as shown in FIG. 6D.

Figure 4:
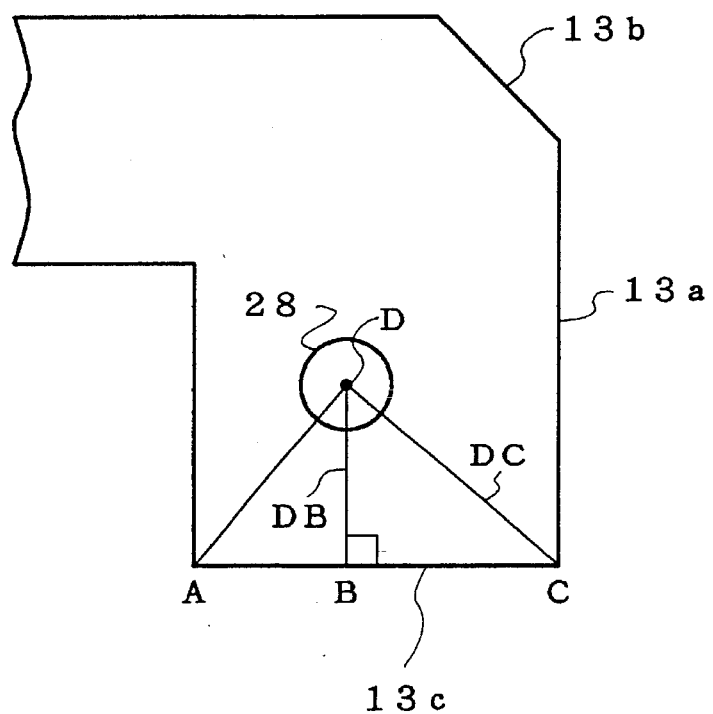
FIG. 4 is a plan view of the bottom part of a lever.

When the lever 13 stands upright, the bottom end 13a of the lever 13 contacts the bridge 22 of the ring 21, as shown in FIG. 3. When the lever 13 is turned forward from the upright position to the lying position as shown in FIG. 4, the corner C between the bottom end 13a and the side end 13c presses the bridge 22 downward against the spring 23 to the depth DC from the center D of the pinhole 28. After that, when the lever 13 lies with the side end 13c contacting the bridge 22, the bridge 22 rises to the depth DB from the center D (DB<DC). As seen from FIG. 4, the lever 13 is stable at the lying position because the depth DB is local minimum and any rotative movement of the lever 13 increases the potential energy of the spring 23 urging the bridge 22 (or the ring 21) upward. The spring force stabilizing the lever 13 at the lying position prevents the lever 13 from being raised up by the centrifugal force when the drum 10 is rotated at high speed, and assures the fixture of the original in the sheet holder 14 on the drum surface.

It is favorable as shown in FIG. 2 that the hooks 11 are planted in the drum 10 so that the lying direction of the lever 13 is oblique backward to the rotating direction R of the drum 10. When the reading head 32 is erroneously moved to the direction D with the lever 13 left upright and the lever 13 interferes with the reading head 32, the lever 13 lies and the head 32 or the drum 10 is safe.

Though, in the above embodiment, end binders 15 and 16 are provided at both ends of the sheet holder 14, it is sufficient to provide one end binder at one end and holes can be formed directly in the sheet holder 14 at the other end. Further it is possible to do without the sheet holder and attach the end binders 15 and 16 having the holes 17 and 18 directly to the original (or the photosensitive film in case of an image recording scanner). If the original (or the photosensitive film) is elastic by itself, the holes can be formed in the original itself corresponding to the hooks 11.

Figure 7A:
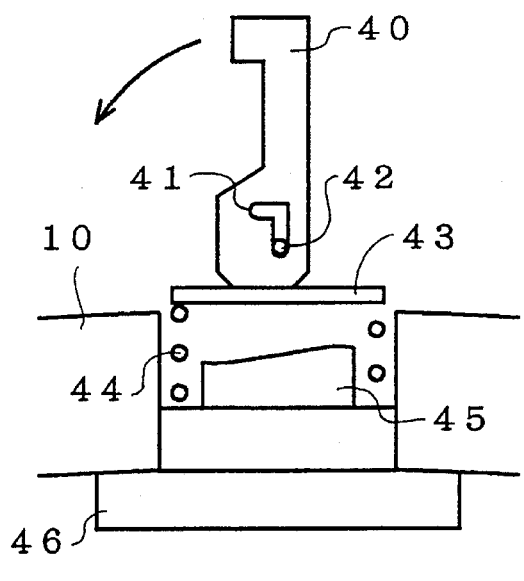
FIG. 7A through 7C are side views of the hook of the second embodiment of the present invention.
Figure 7B:
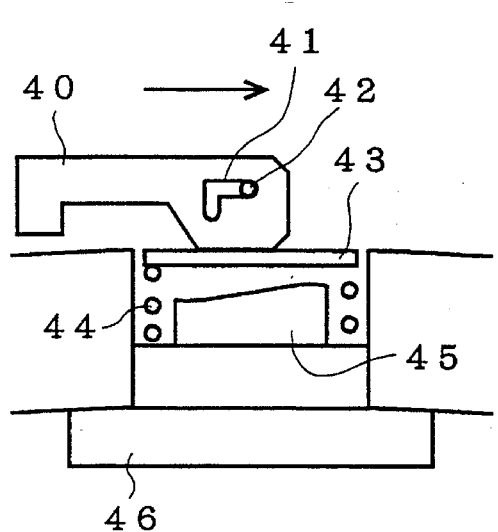
Figure 7C:
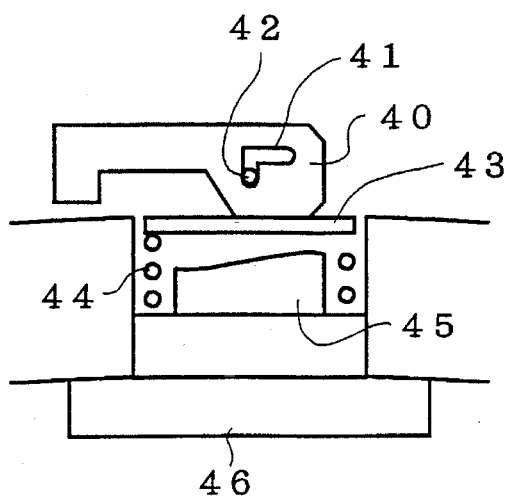
Figure 8:
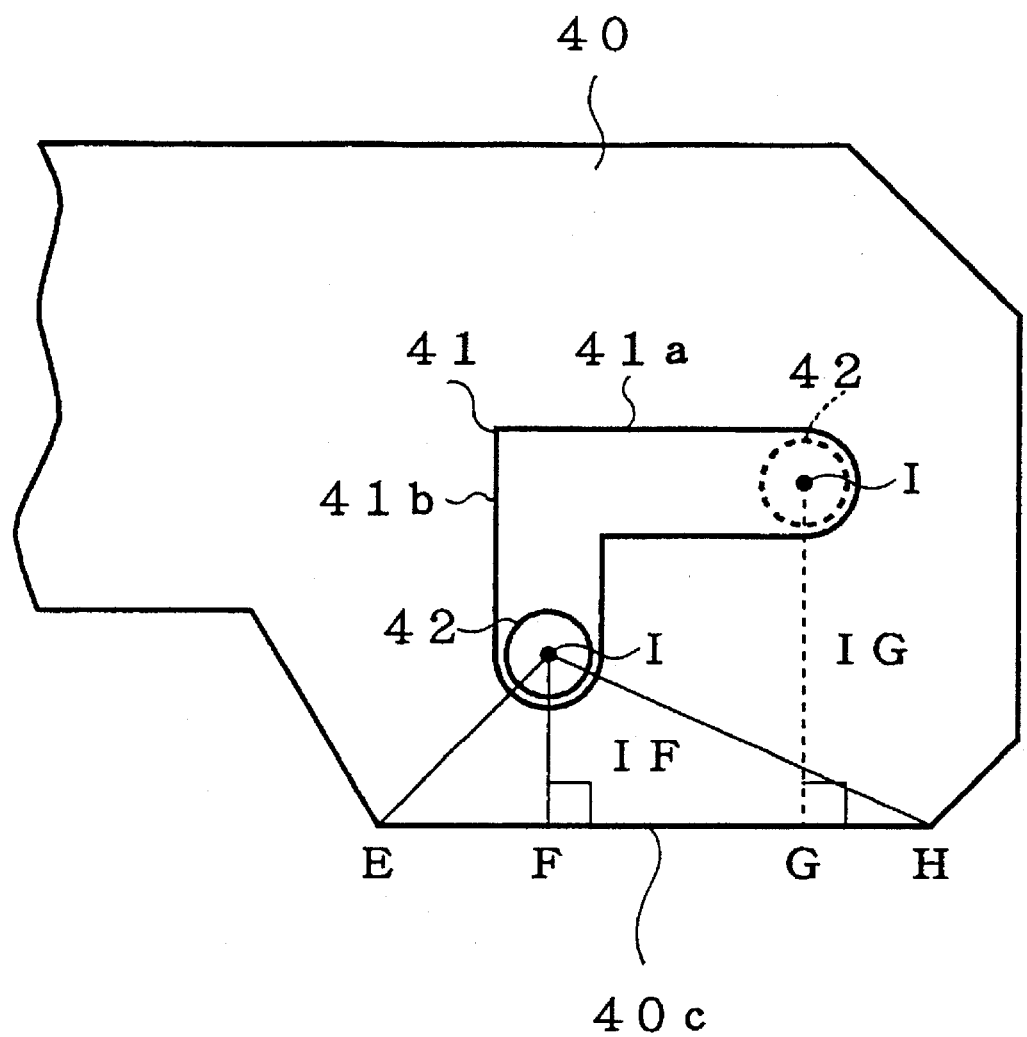
FIG. 8 is a plan view of the bottom end of the lever of the second embodiment.

The second embodiment of the present invention is described using FIGS. 7A through 8. In the original fixing device of the present embodiment, an L-shaped hole 41 is formed at the bottom of the lever 40. After the lever 40 is turned from the upright position as shown in FIG. 7A to the lying position as shown in FIG. 7B, the lever 40 is laterally slid until the pin 42 drops in the shorter arm of the L-shaped hole 41 as shown in FIG. 7C.

The mechanism of stabilizing the lying lever 40 is detailed in FIG. 8. The geometry is as follows. Point G is the foot of the perpendicular line falling from the center I of the pin 42 when the lever 40 is at the position of FIG. 7B, and point F is the foot of the perpendicular line falling from the center I when the lever 40 is at the position of FIG. 7C. Point E is the topward end of the side 40c and point H is the bottomward end of the side 40c. When the lever 40 is in the position shown in FIG. 7B, the depth of the bridge 43 remains the same while the pin 42 moves in the longer arm 41a of the L-shaped hole 41 and the lever 40 moves laterally. Thus the lever 40 is not fixed (or not stable) if the friction is disregarded. When the pin 42 drops in the other arm 41b of the L-shaped hole 41 as shown in FIG. 7C, the bridge 43 is pushed up by the spring 44 by the distance (IG-IF). That is, the spring 44 is released by the height (IG-IF) and has less potential energy, which means the state of FIG. 7C is more stable than the state of FIG. 7B. If the lever 40 is turned up from the state of FIG. 7C, the point H pushes down the bridge 43 against the spring 44. If, on the contrary, the top of the lever 40 is turned down from the state of FIG. 7C, the point E pushes down the bridge 43 against the spring 44. In any case, because the potential energy of the spring increases, the lever 40 is stabilized in the state of FIG. 7C. In FIGS. 7A–7C, numeral 45 corresponds to the stem 12 of the first embodiment and numeral 46 corresponds to the stem base 25.

What is claimed is:

1. A sheet fixing device for fixing a sheet on a drum of a drum type scanner, the sheet fixing device comprising:

a) a plurality of stems standing on the surface of the drum;

b) a lever rotatably attached to each of the plurality of stems, the lever being rotatable between an upright position and a lying position; and c) a stabilizer provided in each of the plurality of stems for stabilizing the lever at the lying position.

2. The sheet fixing device according to claim 1, wherein the sheet fixing device further comprises a sheet holder for holding the sheet and having a row of holes at each of opposing ends of the sheet holder.

3. The sheet fixing device according to claim 2, wherein the lever is attached with a pin to each of the plurality of stems, the lever has a plane at a side, and the stabilizer comprises a plate placed under the lever and a spring for urging the plate to the plane when the lever lies.

4. The sheet fixing device according to claim 3, wherein the lever has an L-shaped hole for admitting the pin, an arm of the L-shaped hole being directed to the plane, whereby the pin drops in the arm when the lever lies.

5. The sheet fixing device according to claim 3, wherein a rotating direction of the lever is oblique to a rotating direction of the drum.

6. The sheet fixing device according to claim 3, wherein a bottom of the lever has a corner cut so that the lever is stable at a position leaning opposite to the lying position with the corner cut contacting the plate.

7. The sheet fixing device according to claim 4, wherein a rotating direction of the lever is oblique to a rotating direction of the drum.

8. The sheet fixing device according to claim 4, wherein a bottom of the lever has a corner cut so that the lever is stable at a position leaning opposite to the lying position with the corner cut contacting the plate.

* * * * *